Aug. 11, 1925.   1,549,671
B. C. KRIDLER ET AL
SPACING INSTRUMENT OR GAUGE
Filed June 28, 1923   3 Sheets-Sheet 2
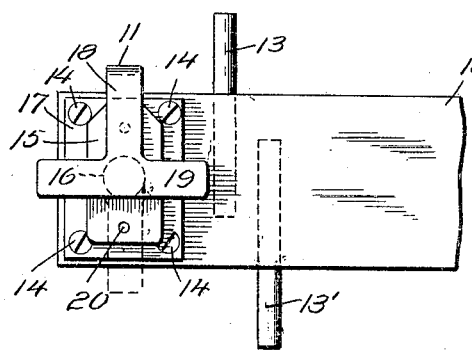
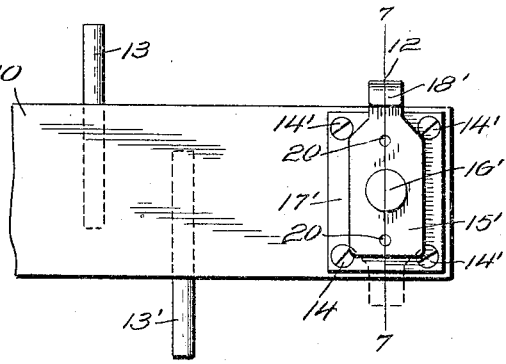
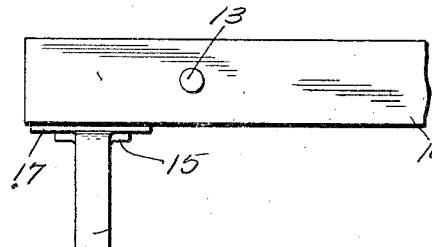
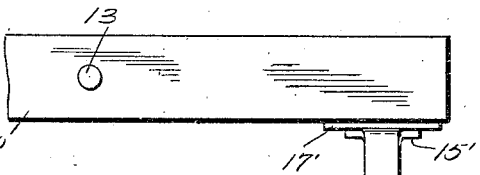
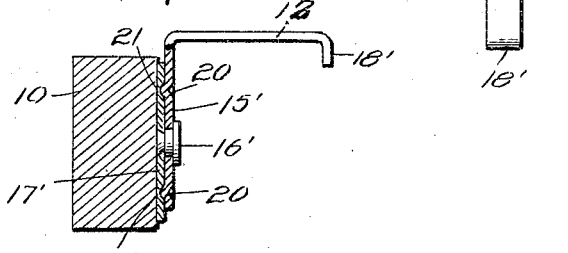
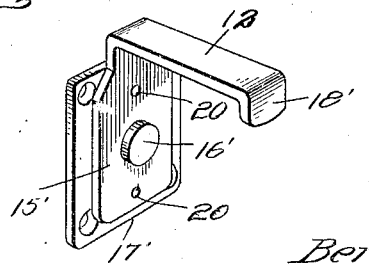
Inventor
Bernie C. Kridler
and James C. Boyle.
By
Attorney

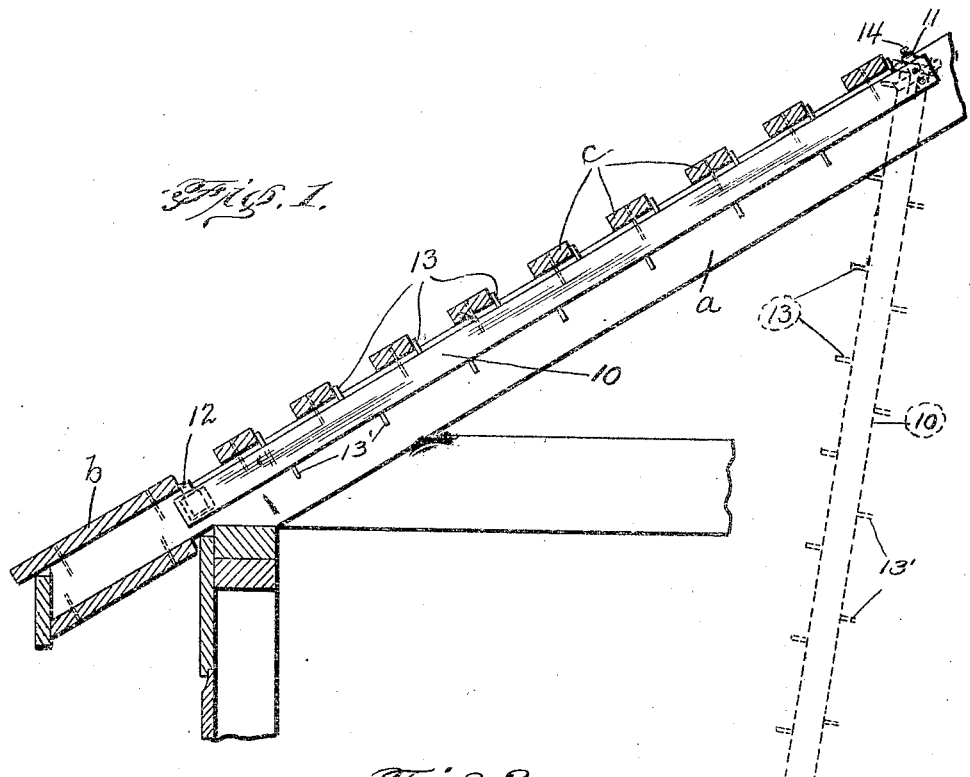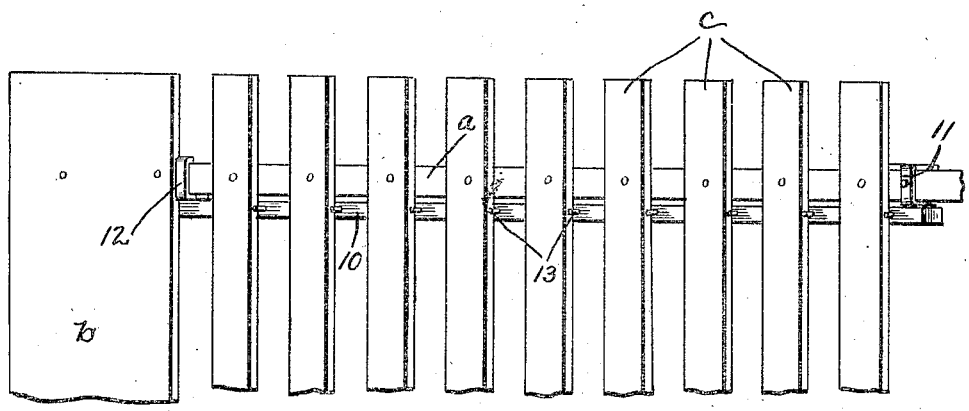

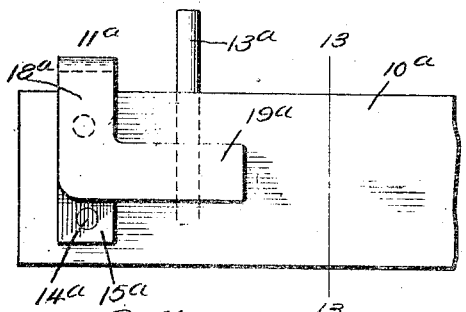
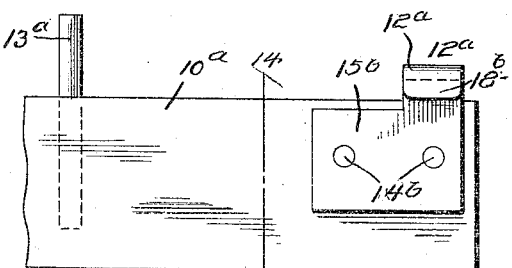
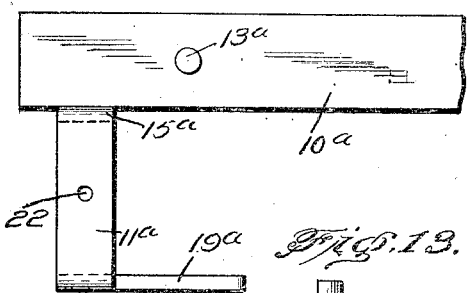
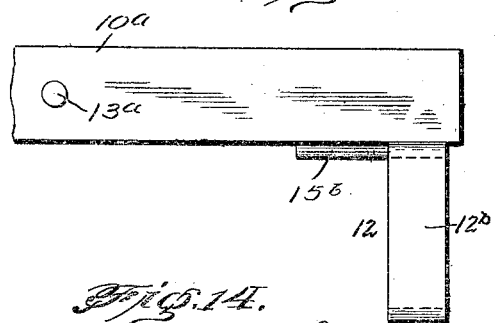
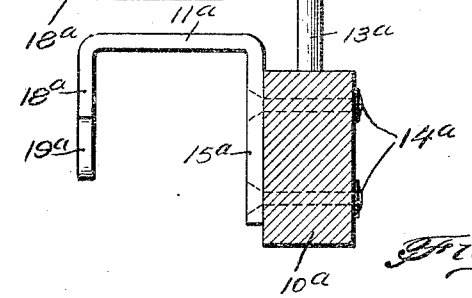
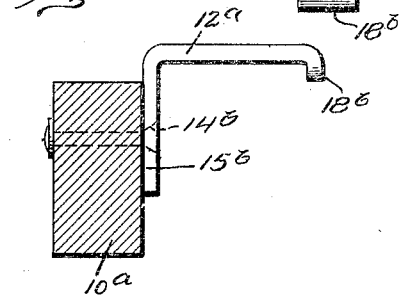
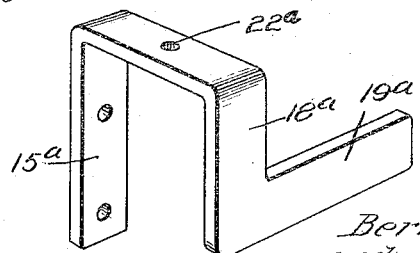

Patented Aug. 11, 1925.

1,549,671

UNITED STATES PATENT OFFICE.

BERNIE C. KRIDLER AND JAMES C. BOYLE, OF FLINT, MICHIGAN, ASSIGNORS TO THE SHINGLE LOCK COMPANY, OF FLINT, MICHIGAN, A CORPORATION OF MICHIGAN.

SPACING INSTRUMENT OR GAUGE.

Application filed June 28, 1923. Serial No. 648,263.

*To all whom it may concern:*

Be it known that we, BERNIE C. KRIDLER and JAMES C. BOYLE, citizens of the United States, and residents of Flint, in the county of Genesee and State of Michigan, have invented certain new and useful Improvements in Spacing Instruments or Gauges, of which the following is a full, clear, and exact description.

This invention relates to certain improvements in spacing instruments or gauges for use in building construction generally, and has for its principal object to provide for a type of the same adapted to facilitate the uniform spacing of furring strips or the like on roof rafters for the proper laying of roofing shingles thereon without necessitating the use of chalk lines or rules ordinarily employed for the purpose.

Another object of the invention is to provide for an instrument or gauge of the class mentioned, and one of an extremely simple and inexpensive construction, and which is capable of being readily and easily placed in or removed from operative position, and transported or moved from one point of use to another.

With the foregoing and other equally important objects in view, the invention resides in the certain new and useful construction and arrangement of parts as will be hereinafter more fully described, set forth in the appended claims, and illustrated in the accompanying drawings, in which:—

Figure 1 is a fragmentary vertical transverse section through a conventional form of roof construction, and showing the manner of applying the instrument or gauge in position for use on one of the rafters of the roof, Figure 2 is a fragmentary top plan view thereof, Figure 3 is an enlarged side elevation of the upper end portion of a preferred embodiment of the gauge, and showing the supporting bracket as applied thereto, Figure 4 is a similar view of the other or lower end portion thereof, and showing the second of the supporting brackets as applied to the same, Figure 5 is a plan view of the end of the gauge as shown in Figure 3, Figure 6 is a similar view of the opposite end of the gauge as shown in Figure 4, Figure 7 is a transverse section through the gauge, the same being taken on the line 7—7 of Figure 4, Figure 8 is a perspective view of the reversable supporting bracket for the lower end portion of the instrument, Figure 9 is an enlarged side elevation of the upper end portion of a modified form of the instrument, Figure 10 is a similar view of the lower end portion thereof, Figure 11 is an enlarged top plan of the upper end portion, Figure 12 is a similar view of the lower end portion, Figure 13 is a vertical transverse section taken on the line 13—13 of Figure 9, Figure 14 is a similar view taken on the line 14—14 of Figure 10, and, Figure 15 is a perspective view of the rafter engaging bracket for effecting the attachment of the upper end of the instrument in position.

Referring to the drawings, wherein similar characters of reference designates corresponding parts throughout the several views thereof, and more particularly to Figures 1 through 8, the preferred embodiment of the invention as shown therein comprises an elongated bar or member 10 having supporting brackets 11 and 12 positioned thereon adjacent the opposite ends of one of its side faces for the attachment of the same from and in position alongside of a roof rafter, and a plurality of equidistantly spaced lugs or pins 13 projecting from its opposite upper and lower edge faces, the lugs or pins projecting from the lower edge face to be hereinafter designated as 13′.

The bar or member 10 may be made from either metal or wooden stock, and, when of the latter material as shown, it will be preferably rectangular in cross-section with the bracket 11 secured in position immediately adjacent one end of its side faces by means of fastenings or screws 14, and the bracket 12 on the same side face at the opposite end of the said side face by means of the similar fastenings 14′, and have sets of the lugs or pins 13 and 13′ projecting from the opposite upper and lower edge faces, respectively. The individual pins or lugs of each set 13 and 13′ will be equidistantly spaced at standard distances apart, as for instance, the pins 13 being spaced four inches one from the other throughout the length of the upper edge face of the bar or member 10, and the pins 13′ at intervals of five inches apart, in correspondence to the desired weather exposure to be allowed to the roofing shingles, when laid.

The bracket 11 is preferably formed from a metal blank shaped to provide an inverted U-shaped portion having its inner leg portion 15 engaged on a pivot pin 16 carried centrally of a supporting plate 17 which is secured by the fastenings 14 to the bar or member 10, while the outer leg portion 18 thereof is formed with an angular extension 19 disposed in parallel relation to the adjacent side face of the bar or member, substantially as shown.

The bracket 12 is also formed from a single piece of metal shaped to inverted U-form to provide an inner leg portion 15′ engaged on a pivot pin or stud 16′ carried centrally of a supporting plate 17′ secured to the bar or member 10 by the fastenings 14′, and an outer leg portion 18′ which is made much shorter than the inner leg portion 15′, for purposes which will be presently explained.

These supporting brackets 11 and 12 are reversible on the pivots 16 and 16′ correspondingly with the use of either set of the gauging lugs or pins 13 and 13′, and to retain the same in either of their operative positions, the inner leg portions 15 and 15′ thereof are formed to provide a pair of indents 20, one indent to either side of the pivots 16 and 16′, which snap or seat in depressions 21 formed in the supporting plates 17 and 17′ for their reception.

In the modified form of the instrument or gauge, as shown in Figures 9 through 15, the bar or member 10 will have a bracket 11ª secured in position on one of its side faces by means of the fastenings 14ª, and a bracket 12ª on the same side face by means of the fastenings 14ᵇ, while the gauging lugs or pins 13ª will be driven or otherwise secured in the upper edge only of the bar or member in uniformly spaced and aligned relation.

The bracket 11ª, in this instance of the invention, is preferably formed from a metal blank shaped to provide an inverted U-shaped portion having its inner leg 15ª secured against the side face of the bar or member 10 by the fastenings 14ª, and its outer leg portion 18ª formed at its free depending end with an angular extension 19ª extending parallel to the side face of the adjacent end portion of said bar or member.

The bracket 12ª is preferably shaped from a single piece of metal to substantially U-form with its inner leg portion 15ᵇ in the form of a supporting plate secured against the side face of the bar or member 10 by means of the fastenings 14ᵇ, and its outer leg 18ᵇ shortened to an appreciable extent relative to the inner leg 15ᵇ, substantially as shown.

In use, the bar or member 10 is to be supported in parallel relation alongside of a rafter of a roof by engaging the U-shaped portions of the brackets 11 and 12 over an adjacent rafter, with the bracket 11 at the inner or upper end of the bar or member and the bracket 12 at the outer or lower end thereof. The U-shaped portion of the bracket 11, in either instance of the invention, is of a substantial depth to fully engage over the top edge of the rafter, and the angular extension 20 engages the side face of the latter opposite to that face against which the bar or member 10 is positioned and acts thereon in a manner to maintain the bracket engaged at all times against accidental displacement therefrom. The U-shaped portion of the bracket 12 is also of a sufficient depth to engage over the rafter but the outer leg portion 18 thereof is shortened so as to be readily disengaged from engaged position, by a slight upward raising of the lower end of the bar or member 10, without causing the bracket 11 from being disengaged at the same time. When properly positioned on a rafter, the uppermost edge face of the bar or member 10 is disposed in a plane slightly below the top edge of the adjacent rafter, so that a clearance is provided between this face of the bar or member and the under sides of the furring strips, after the latter are laid on and secured to the rafters of the roof. This clearance allows for the slight upward movement necessary to release the bracket 12 from engaged position on the adjacent rafter, when it is desired to remove the bar or member 10 from the rafter or to adjust the same along the latter to a new position for the completion of the laying of the furring strips over the entire roof. With the bracket 12 fully freed from its engagement with the adjacent rafter, the bar or member 10 may be allowed to swing downwardly from its parallel relation to the rafter, when the bracket 11 will act as a pivot for the necessary swinging movement but will remain engaged with the rafter, above the last furring strip laid and secured in position, by reason of the greater depth of its U-shaped portion and of the angular extension formed therewith. With the bar or member 10 in position on a rafter, the free ends of the several lugs or pins 13, projecting from the upper most side edge of the same, will project for a distance above the plane of the top edge of the adjacent rafter for the abutting against the same of the furring strips as they are laid and secured in position on the several rafters of the roof. By abutting the furring strips against the lower sides of each of the pins 13, these strips will be properly gauged in spaced relation one with respect to the other for the laying of the standard forms of roofing shingles thereon in the usual manner.

In the preferred form of the invention, as shown in Figures 1 through 8, and as hereinbefore explained, the sets of pins 13 and 13', at the upper and lower edges of the bar or member 10, are spaced at different distances apart, the set 13 to one standard of weather exposure length of shingle and the set 13' to another standard of weather exposure length, so that, having determined the desired exposed length of shingle required, the bar or member 10 will be reversed end for end to bring the proper set of gauging lugs or pins uppermost, when the brackets 11 and 12 will be swung on their respective pivots 16 and 16' accordingly to suspend the bar or member from an adjacent rafter.

Referring particularly to Figures 1 and 2, in laying a shingle roof on the rafters $a$, a starting or eaves-board $b$ is first secured in position along the lower ends of the rafters $a$, and afterwards the furring strips $c$ are secured upwardly of the rafters in equidistantly spaced relation, one parallel to the other and to the starting board $b$, and it is the function of the present instrument or gauge to facilitate the accurate laying and securing of these furring strips $c$ in such position, and, to this end, two or more of the instruments or gauges are employed for the purpose, the same being applied to alternately disposed rafters, or rafters otherwise removed one from another, so that the opposite ends of any one of the furring strips to be laid and secured will extend across adjacent instruments of gauges for the abutting of the same against the complemental of the gauging lugs or pins 13.

Now, with the starting or eaves-board $b$ secured in position, the brackets 11 and 12 of each of the instruments or gauges employed, will be engaged over an adjacent rafter $a$, with the U-shaped portion of the bracket 12 abutting the inner edge of the starting board, when a number of furring strips $c$ will be laid on the rafters $a$, one at the lower side of each of the lugs or pins 13 of the instruments or gauges, when the furring strips will be moved successively upward of the rafters into abutting relation to the near sides of the lugs or pins 13 and then nailed into position. When the nailing operation is completed on a number of the furring strips corresponding to the number of the lugs or pins 13 on one side of the instruments or gauges, and it is desired or necessary to adjust the instruments or gauges higher up the rafters $a$ for the completion of the laying of the furring strips $c$, the lower ends of the gauges will be raised to free the brackets 12 from engagement with the adjacent rafters. By now moving the lower ends of the gauges sidewise, the U-shaped portions thereof will clear the top edges of the rafters, when, by releasing the gauges, the same will swing downwardly to the dotted line position as shown in Figure 1, during which swinging movement, the brackets 11 will act as pivots and the extensions 19 thereof will prevent the accidental disengagement thereof from the rafters. The brackets 11 may now be slid upwardly along the engaged rafters to or toward the ridge of the roof framing, and the brackets 12 again engaged over the rafters and disposed in abutting relation to the upper side edge of the uppermost of the furring strips previously laid and secured. With the gauges adjusted to their new positions, the laying and nailing of the furring strips $c$ will be continued until the required number of the same have been placed.

To retain the gauges 10 in initially adjusted position, and against accidental displacement during the laying and nailing of the furring strips $c$, the connected portions of the U-shaped portions of the brackets 11 are preferably provided with openings $22^a$, through which nails will be driven for the purpose, these nails being withdrawn when it is desired or necessary to further adjust the gauges.

With the foregoing understanding of the invention, it will be readily obvious that the gauges are capable of use with equal facility by unskilled as well as by skilled labor; that the same may be instantly applied to the rafters in a manner to save much time and labor in effecting a quick and proper spacing of the furring strips over the methods now employed for the purpose; and that they are practical, fool-proof and accurate in operation and may be of any desired size or capacity.

It will also be understood that, while preferred embodiments of the instrument or gauge have been described and illustrated herein in specific terms and details of construction, arrangement and operation, various changes in and modifications of the same, may be resorted to without departing from the spirit of the invention, or the scope of the claims appended hereto.

Having thus fully described the invention, what is claimed, is:—

1. A gauge as characterized comprising a bar, rafter-engageable brackets carried on opposite ends of said bar, and furring strip spacers disposed in longitudinal spaced relation on said bar.

2. A gauge as characterized comprising a bar, brackets on one side of said bar at opposite ends thereof for engagement over a rafter, and furring strip spacing members carried in longitudinal spaced relation on the top of said bar.

3. A gauge as characterized comprising a bar of rectangular cross-section, brackets extending laterally from the opposite ends thereof from one side face, said brackets being formed to engage over the top of a rafter with the body of the bar disposed below the top thereof, and spacing pins projecting from the top of said bar in longitudinal spaced relation thereon.

4. A gauge as characterized comprising a bar of rectangular cross-section, brackets extending laterally from one side face thereof and at opposite ends thereof for engagement over a rafter with the bar disposed below the top thereof and parallel therewith, and a series of longitudinally spaced furring strip gauge pins in said bar and projecting above the top of the engaged rafter when applied.

5. A gauge as characterized comprising a bar adapted to lie parallel to and against a rafter, brackets extending laterally from opposite ends of said bar for engagement over the rafter to suspend said bar from one side thereof slightly below the top thereof, one of said brackets being pivoted on said bar, and longitudinally spaced gauge pins projecting from the top of said bar above the top of the engaged rafter when applied.

6. A gauge as characterized comprising a bar adapted to lie parallel to and against one side of a rafter, brackets extending laterally from opposite ends of said bar and at one side thereof, one of said brackets being formed to engage over the top and one side of the rafter, the other of said brackets being formed to engage over the top of said rafter whereby to suspend said bar from the rafter at one side thereof, and gauge pins disposed in longitudinal spaced relation on said bar for projection above the top of the engaged rafter.

BERNIE C. KRIDLER.
JAMES C. BOYLE.